United States Patent [19]

Hasegawa

[11] Patent Number: 5,001,510
[45] Date of Patent: Mar. 19, 1991

[54] TAKING SYSTEM FOR TV IMAGE
[75] Inventor: Akira Hasegawa, Hachiouji, Japan
[73] Assignee: Olympus Optical Co., Ltd., Tokyo, Japan
[21] Appl. No.: 436,739
[22] Filed: Nov. 15, 1989

[30] Foreign Application Priority Data

Nov. 16, 1988 [JP] Japan .................................. 63-289340
Jan. 18, 1989 [JP] Japan .................................. 1-009099

[51] Int. Cl.$^5$ .............................................. G03B 27/68
[52] U.S. Cl. ........................................ 355/20; 355/52; 346/110 R; 358/244
[58] Field of Search .......................... 355/20, 52, 77; 346/110 R; 358/244

[56] References Cited

U.S. PATENT DOCUMENTS 3,836,926 9/1974 Seitz et al. .................. 355/20 X
3,980,405 9/1976 Tatsuno et al. ............... 355/52 X
4,760,447 7/1988 Koka et al. .................. 358/139

FOREIGN PATENT DOCUMENTS 60-66242 4/1985 Japan .
60-34731 8/1985 Japan .

Primary Examiner—L. T. Hix
Assistant Examiner—D. Rutledge
Attorney, Agent, or Firm—Cushman, Darby & Cushman

[57] ABSTRACT

The taking system for TV image is equipped with a plural number of cameras which are to be attached selectively in front of a TV screen and have film sizes different from one another, and the imaging lens systems of the cameras have half field angles of 20° to 30° different from one another within a range of 4° and are so designed as to produce distortion capable of correcting distortion of an image caused due to the curvature of the TV screen. This system can be designed compact as a whole, and permits simplifying structure of the camera exchange mechanism, photographing images always in the normal shapes thereof and providing photographs of good quality.

6 Claims, 14 Drawing Sheets

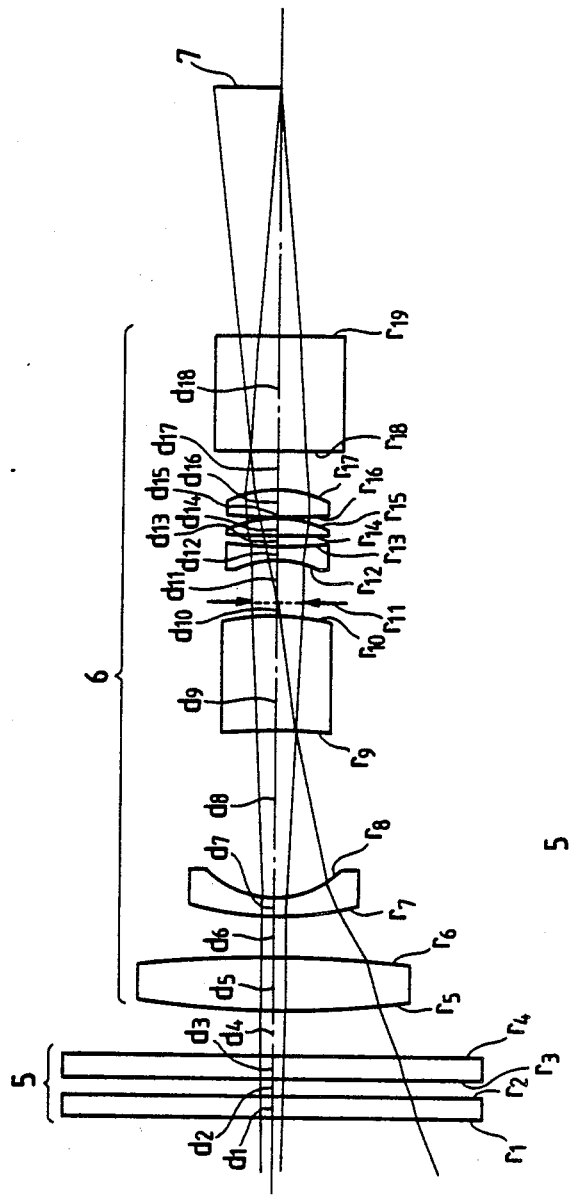
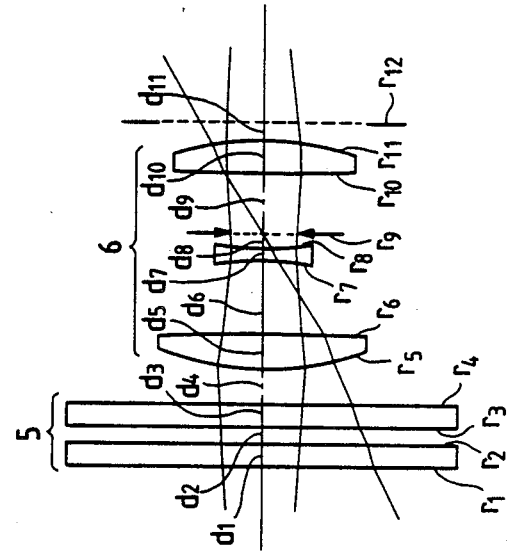
FIG. 14
FIG. 15

TAKING SYSTEM FOR TV IMAGE

BACKGROUND OF THE INVENTION (a) Field of the Invention

The present invention relates to an image taking system to be used for photographing images, such as TV images, which are formed on screens having curvature.

(b) Description of the Prior Art

As one of the conventional image taking systems of this type, there is known a system so adapted as to photograph TV images with a plural number of cameras having different photographing image sizes which are to be arranged selectively in front of a TV screen displaying images on the basis of video signals.

This system consists, for example as illustrated in FIG. 1, of a TV monitor 1 for displaying images formed on the basis of video signals, a main body 4 comprising an electrical circuit 2 connected to the TV monitor 1 and having mount 3 located in front of the screen of the TV monitor 1, and a plural number of cameras 8, 8' which comprises color correcting filters 5, 5' for matching colors of images formed on the TV monitor 1 with spectral sensitivities of films, imaging lens systems 6, 6' and films 7, 7', are different from one another in size and focal length thereof, and can be attached selectively to the mount of the main body 4. This system is so adapted as to photograph images displayed on the TV monitor 1 by focusing the images onto the films 7, 7' with the imaging lens systems 6, 6' through the color correcting filters 5, 5' as illustrated in FIG. 2A and FIG. 2B.

In the system described above, however, the optical systems of the cameras 8, 8' are not composed systematically and the distances as measured from the imaging lens systems 6, 6' to the TV monitor 1 are different for the individual cameras. Accordingly, the mount for attaching the imaging lens systems to the camera bodies has complicated mechanical structure and diameter of the light bundle passing through the mount is different for the individual cameras. In order to allow all the cameras to be attached commonly to the mount, it is necessary to uniformalize diameters of the mounts and the filters 5, 5' with that of the largest mount, thereby increasing diameters of the mount 3 and the filters 5, 5', and posing a problem to enlarge the image taking system as a whole. In order to solve this problem, there has been proposed an image taking system which comprises, as disclosed by Japanese Preliminary Patent Publication No. 66242/60, a pair of imaging lens systems which can be inserted alternately into the photographing optical path and have focal lengths different from each other, and filters or the similar members arranged at intermediate locations in the individual imaging lens systems. In the composition of this image taking system where the imaging lens systems are exchanged both inside and outside the mounts, however, mechanical structure of the mounts is more complicated and the imaging lens systems cannot be exchanged easily, thereby posing a problem that location of the filters or the similar members is restricted.

Further, the screen of the TV monitor 1 generally has curvature which is classified into the two types shown in FIG. 3A and FIG. 3B respectively. The screen illustrated in FIG. 3A is referred to as the cylindrical type which has the shape of a portion of a cylindrical surface having a radius of R. The screen shown in FIG. 3B is referred to as the spherical type which has the shape of a portion of a spherical surface having a radius of R.

Now let us consider a case where an image formed on the TV monitor 1 is to be photographed with a lens system free from aberrations including distortion. FIG. 4A illustrates an image 9' which is obtained by forming a lattice image 9 as shown in FIG. 4C on the cylindrical type screen of the TV monitor 1 having the radius of R as shown in FIG. 4B and photographing the lattice image onto the film 7 with the imaging lens system 6. Let us assume that a reference symbol x represents the distance as measured from the front focal point ff of the imaging lens system 6 to the center of the screen of the TV monitor 1 and that the line 10 of the lattice image 9 is located at the center of the screen. Let us further assume that a reference symbol $\Delta x$ represents a difference in the distance measured in the direction along the optical axis from the center of the screen to the outermost circumference, i.e., the line 11. When focal length of the imaging lens system is designated by a reference symbol f, we obtain:

Magnification $\beta_{10}$ for the line $10 = f/x$ (1)

Magnification $\beta_{11}$ for the line $11 = \dfrac{f}{x + \Delta x}$ (2)

Due to the difference between the magnification levels expressed by the equations (1) and (2), the lattice image is photographed as the image 9' on the film 7. Speaking more concretely, the image 9 formed on the screen of the TV monitor 1 is affected by the magnification difference produced dependently on image height. When the image 10' of the line 10 is considered as an ideal image, the image 11' of the line 11 is affected by the magnification difference (difference between the actual magnification and ideal magnification) or considered as contracted as compared with the image 10'. This consideration is similar to the concept of distortion in the optical theory which is defined as:

$$DIS = \dfrac{\beta_{11}(\text{actual magnification}) - \beta_{10}(\text{ideal magnification})}{\beta_{10}(\text{ideal magnification})} \times 100(\%) \quad (3)$$

When the equations (1) and (2) are used in the formula (3) above and distortion in this case is represented by DISC (%), we obtain:

$$DISC = \left( \dfrac{f}{x + \Delta x} - \dfrac{f}{x} \right) \times \dfrac{x}{f} \times 100(\%) \quad (4)$$
$$= - \left( \dfrac{\Delta x}{x + \Delta x} \right) \times 100(\%)$$

In this case, sign of $\Delta x$ is taken as positive when it is measured leftward along the optical axis.

Now, let us consider the case of the TV monitor 1 which has the spherical type screen illustrated in FIG. 3B. FIG. 5A shows a front view of the TV monitor 1. The TV monitor 1 generally has a vertical-to-horizontal ratio which is equal to an interlace ratio of 3:4. FIG. 5B shows a sectional view taken along the diagonal direction 12 in FIG. 5A, whereas FIG. 5C shows a sectional view taken along the diagonal direction z in FIG. 5A. When a lattice image 13 is formed on the spherical type screen of the TV monitor 1 by using the imaging lens system 6, magnification for the center line 14 and that for the outermost circumferential line 15 are:

$$\text{Magnification } \beta_{14} \text{ for the line } 14 = \frac{f}{x + \Delta\gamma} \quad (5)$$

$$\text{Magnification } \beta_5 \text{ for the line } 15 = \frac{f}{x + \Delta\eta} \quad (6)$$

Assuming that $\beta_{14}$ is the ideal magnification and 15 is the actual magnification, distortion DISS (%) on the spherical type screen having the radius of R is expressed by the following formula (7):

$$DISS = \left(\frac{f}{x + \Delta\eta} - \frac{f}{x + \Delta\gamma}\right) \times \left(\frac{x + \Delta\gamma}{f}\right) \times 100(\%)$$

$$= \left(\frac{\Delta\gamma - \Delta\eta}{x + \Delta\eta}\right) \times 100(\%) \quad (7)$$

Wherein the reference symbols $\Delta\gamma$ and $\Delta\eta$ represent distances measured along the optical axis between the center of the screen and the outermost circumferences, taking the signs thereof as positive when measured leftward along the optical axis. As is understood from the formulae (4) and (7), the spherical type is more advantageous than the cylindrical type when both the types of screen have the same size and the same curvature. In the recent days where color graphics, tables, graphs, etc. displayed on TV monitors are frequently photographed, it is desired to completely eliminate or correct distortion for these purposes. However, it is difficult to correct images so as to be observable in normal shapes thereof by the CRTs proper from the viewpoint of designing of the polarization yokes of CTRs and the images are generally deformed when observed by human eyes.

Moreover, distortion in lens systems allowable or insensible for photographing is generally considered as that within a range from −2% (barrel type) to +1.5% (spindle type). It is therefore desirable to limit distortion within this range also for photographing images formed on the screens of TV monitors.

SUMMARY OF THE INVENTION

In view of the problems described above, it is a primary object of the present invention to provide a taking system for TV image of the above-described type which can be designed compact as a whole and permits simplifying structures of the camera exchange mechanism, etc.

It is another object of the present invention to provide a taking system for TV image which permits photographing images in the normal shapes thereof by easily correcting distortion of the images caused by magnification difference due to curvature of TV screens and is free from the inconvenience of images distorted as viewed by human eyes when the images are corrected by CRTs proper.

It is a further object of the present invention to provide a taking system for TV image of the above-described type which has high operability, comprises little useless space and permits photographing images of high quality.

According to the present invention, these objects are accomplished by equipping a plural number of cameras to be mounted selectively in front of a TV screen and having different photographing image sizes with imaging lens systems having focal lengths different from one another, setting the cameras at half field angles different within 4° from one another and within a range from 20° to 30° and designing the imaging lens system of each of the cameras so as to have distortion capable of correcting distortion defined by the above-mentioned formulae (4) and (7).

In a preferred formation of the present invention, the imaging lens systems 6, 6', 6" to be used for films 7, 7', 7" having different image sizes have approximately the same field angle and can be located at approximately the same position on the optical axis even in a case where an image formed on the TV monitor 1 is to be photographed onto the three types of films. Accordingly, the positional relationship between the imaging lens systems and the mounts remains substantially unchanged regardless of focal lengths of the imaging lens systems 6, 6', 6", and it is possible to simplify the mechanical structure. Further, since diameter of the light bundle remains substantially unchanged by exchanging the imaging lens system with one another in the main body 4, the mount 3, filter 5, etc. can have small dimensions, thereby making it possible to arrange, in the vicinity of the mount 3, the control knobs and switches for the TV monitor 1 as well as those for exposure and shutter release for photographing, and enhance operability of the taking system for TV image. Furthermore, when an electrical circuit is to be arranged between the mount 3 and the screen of the TV monitor 1, it is easy to reserve an area allowing no passage of light since the field angles and height of the outermost marginal ray are standardized for all the imaging lens systems.

The taking system for TV image according to the present invention is capable of forming distortion-free images on film surfaces even by photographing an image formed on a TV monitor screen having curvature by setting distortion DISL (%) of the imaging lens systems so as to satisfy the following condition:

For an image formed on TV monitor having cylindrical type screen:

$$-2 \leq DISL + DISC \leq 1.5 \quad (8)$$

For an image formed on TV monitor having spherical type screen:

$$-2 \leq DISL + DISS \leq 1.5 \quad (9)$$

These and other objects as well as the features and the advantages of the present invention will become apparent from the following detailed description of the preferred embodiments when taken in conjunction with the accompanying drawings.

BRIEF DESCRIPTION OF THE DRAWINGS

FIG. 12 through FIG. 17 are sectional views illustrating Embodiments 1 through 6 of the imaging lens system according to the present invention to be attached to the TV monitor;

DESCRIPTION OF THE PREFERRED EMBODIMENTS

Prior to detailed description of the present invention with reference to the preferred embodiments, description will be made below with reference to FIG. 6 through FIG. 11 on the values of half field angles at which the imaging lens systems are to be set.

Field angle in the taking system for TV image is to be determined under restrictions imposed by total length thereof and the light quantity on the marginal portion of the film. First of all, description will be made on the restriction imposed by the total length of the taking system for TV image. When distance as measured from the principal point of the imaging lens system to an object (the TV monitor screen in this case) is represented by l, half length of the diagonal line of the screen of the TV monitor 1 is designated by y and half field angle of the imaging lens system is denoted by ω, relationship among these factors is expressed as follows:

$$l = y/\tan \omega \quad (10)$$

Figure 7:
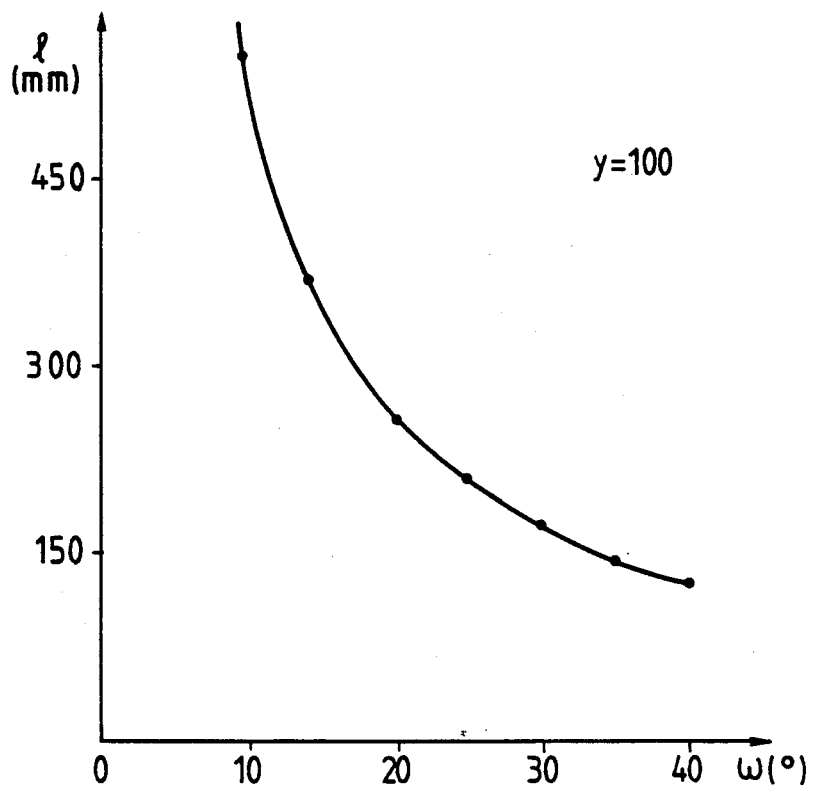
FIG. 7 is a graph illustrating relationship between the distance as measured from the principal point of the imaging lens system to an object and the half field angle.
Figure 9:
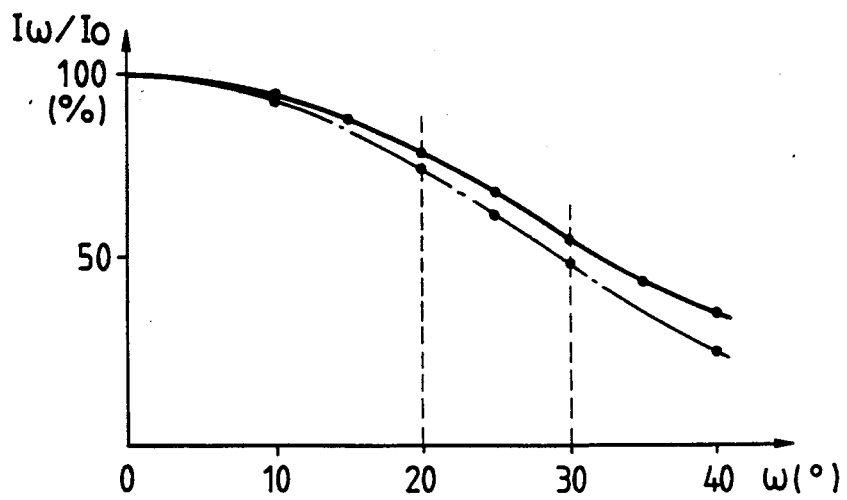
FIG. 9 is a graph illustrating ratio of marginal light quantity relative to central light quantity.

This relationship is illustrated in a form of a graph in FIG. 7, taking y as 100. As is seen from this graph, l abruptly increases when ω exceeds 20, thereby producing a wide dead space in the section between the screen of the TV monitor and the surface of the imaging lens system. Further, when total length of the imaging lens system is represented by L, it is expressed by the following formula:

$$L = \frac{y}{\tan \omega}(1 + \beta) = l(1 + \beta) \quad (11)$$

Wherein the reference symbol β represents magnification of the imaging lens system. Speaking concretely, enhancement of the magnification β prolongs the total length of the imaging lens system, thereby enlarging the taking system for TV image. It is therefore desirable to select the half field angle ω of the imaging lens system within the range defined below:

$$\omega \geq 20° \quad (12)$$

Figure 10:
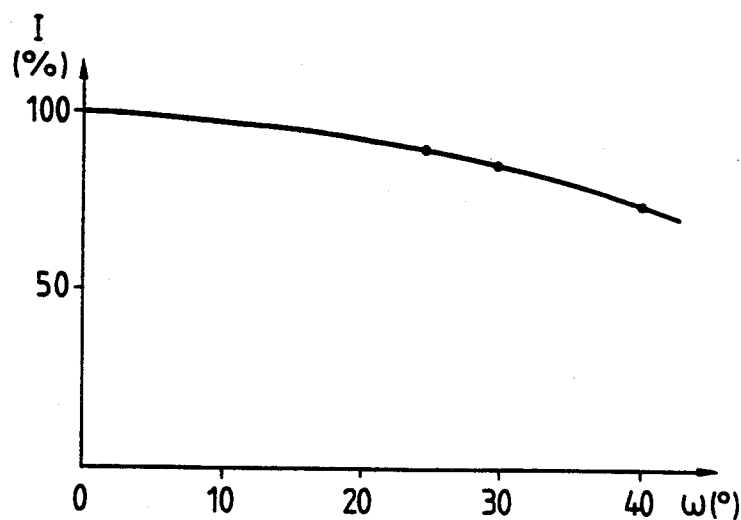
FIG. 10 is a graph illustrating light distribution characteristic of the TV monitor.

In the next place, description will be made on the restriction imposed by the light quantity on the marginal portion of the film. Assuming that the light quantity on the marginal portion of the film is represented by I and the light quantity on the central portion of the film is designated by $I_0$ at the half field angle ω in FIG. 8, the light quantity Iω on the marginal portion of the film in an aberration-free condition is generally expressed by the following formula known as the law of $\cos^4\theta$:

$$I\omega = I_0 \eta \cos^4\theta \quad (13)$$

Wherein the reference symbol η represents the aperture efficiency. Assuming that η is 1, ratio of the light quantity on the marginal portion of the film to the light quantity on the central portion of the film $I\omega/I_0$ is indicated by the solid line shown in FIG. 9. Further, in the case of the taking system for TV image, it is necessary to taken light distribution characteristic of the TV monitor 1 into consideration in addition to the law of $\cos^4\theta$. A typical example of the light distribution characteristics measured by the inventor et al is illustrated in FIG. 10 wherein the reference symbol I represents light emission intensity expressed taking emission quantity in the direction along the optical axis as standard. When the light distribution characteristic of the TV monitor 1 is taken into consideration, the ratio of the light quantity on the marginal portion of the film to the light quantity on the central portion of the film becomes as indicated by the chain line in FIG. 9, or the light quantity Iω on the marginal portion of the film is lowered to approximately 50% of the light quantity $I_0$ on the central portion of the film at ω=30°, thereby producing an inconvenience to make darkness noticeable at the marginal portions of photographs. Further, the color correcting filter 5 is added in front of the lens system for matching color between the TV monitor 1 and the films 7, 7' of each camera. If the field angle is large enough to allow the light bundle incident on the filter 5 to contain rays which are incident in oblique directions, transmittance of the filter 5 is lower for the rays contributing to formation of image on the marginal portion of the screen than the rays contributing to formation of image on the central portion of the screen. Accordingly, color balance is not matched between the central portion and the marginal portion of the screen, whereby reproduced colors are different between the central portion and the marginal portion of an image formed on the film. Also for solving this problem, it is desired to limit the field angle within a range smaller than 30°. It is therefore desirable to select the half field angle ω within the range defined below:

$$\omega \leqq 30° \quad (14)$$

On the basis of the formulae (12) and (14), the imaging lens system should desirably have the half field angle ω within the following range:

$$20° \leqq \omega \leqq 30° \quad (15)$$

Figure 11:
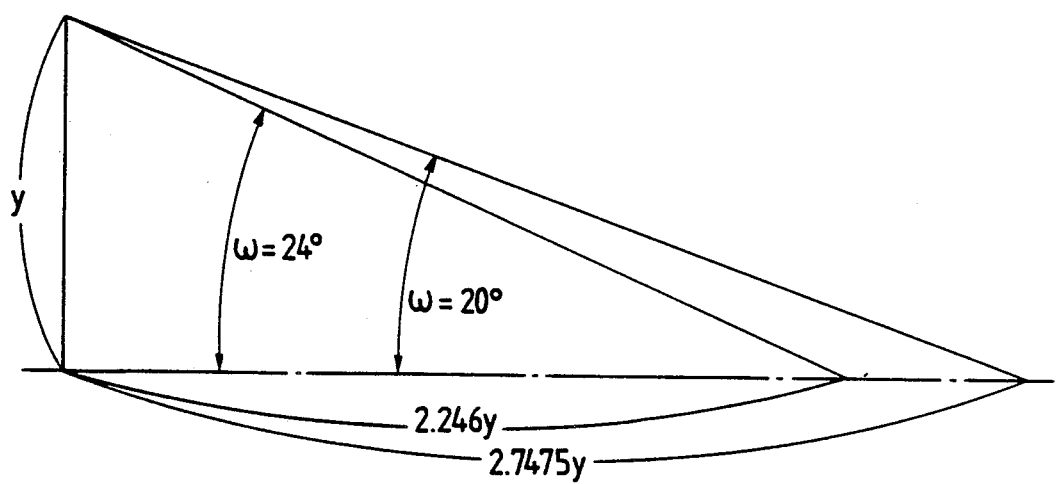
FIG. 11 is a diagram illustrating relationship between difference in half field angle and difference in distance to an object.
Figure 12:
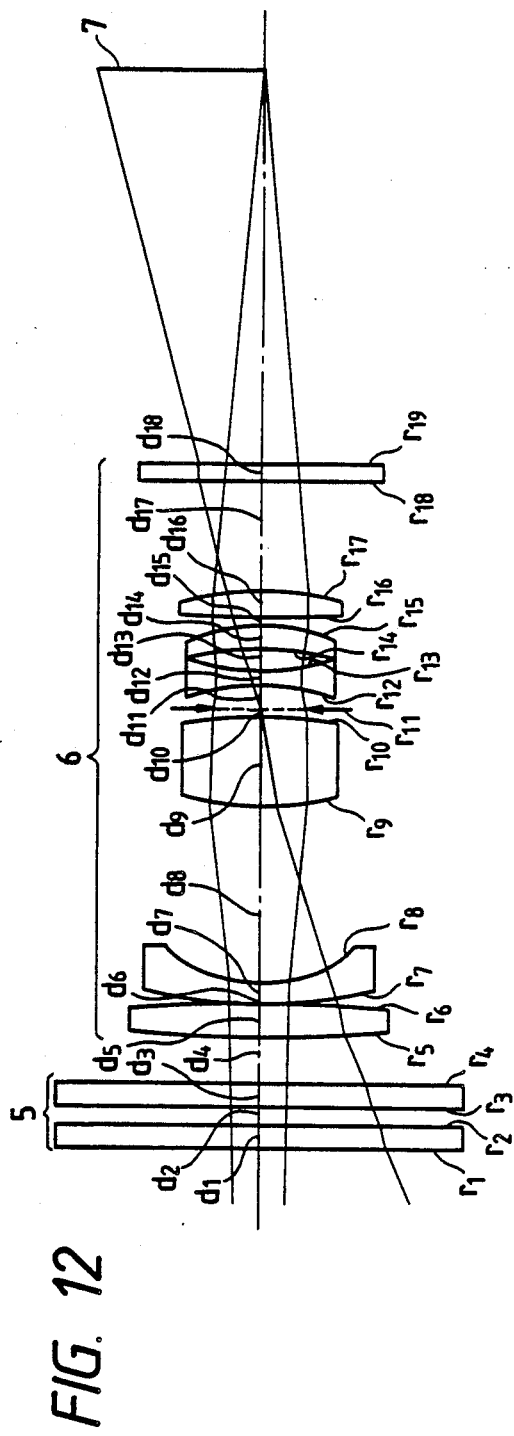
Figure 13:
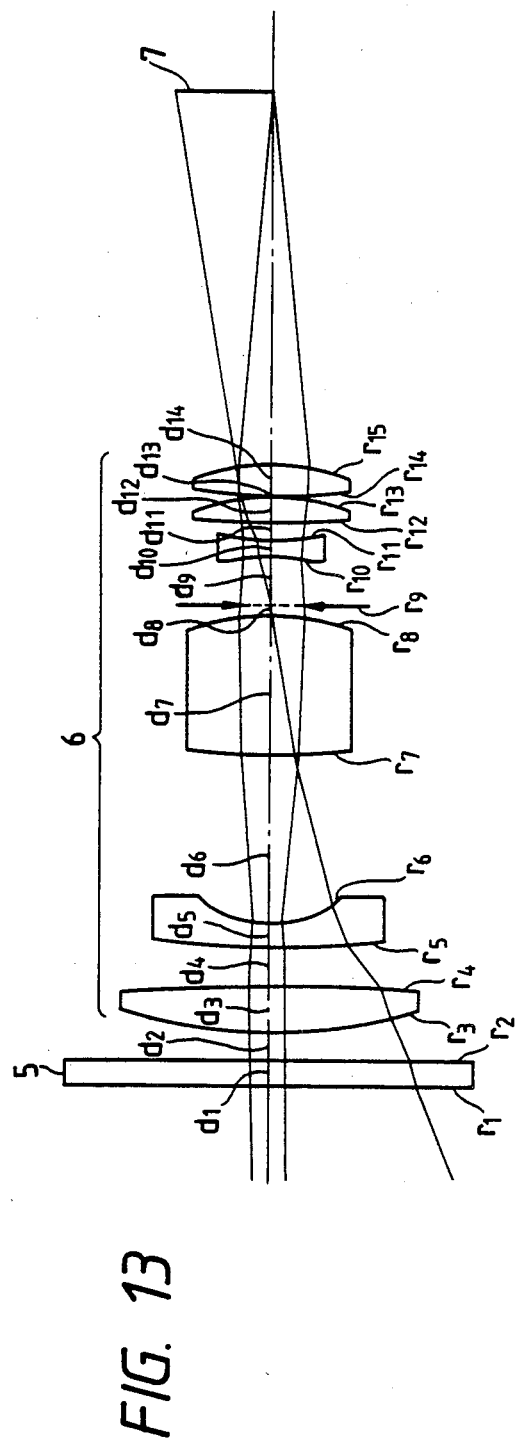

From the viewpoints of compact design of the mount 3 and utilization of dead space, it is necessary to standardize field angles of the imaging lens systems as already described above. Now, description will be made on standardization degree of the field angles of the imaging lens systems within the range defined by the formula (15). FIG. 11 illustrates the worst case where the distances as measured from the imaging lens systems to the TV monitor 1 are different from one another due to the field angles which are not standardized. When half of the length of the diagonal line on the screen of the TV monitor 1 is represented by y, the difference in the distance as measured from the imaging lens system 6 to the screen of the TV monitor between ω=24° and ω=20° is:

$$\frac{y}{\tan 20°} - \frac{y}{\tan 24°} \approx 0.5 y \quad (16)$$

This difference corresponds to 50% of the half length of the diagonal line on the screen of the TV monitor or approximately 20% of the distance as measured from the imaging lens system 6 to the screen of the TV monitor 1. If the difference becomes larger, it will be necessary to use a complicated structure around the mount 3 and match diameter of the mount 3 with ω=20°, thereby producing inconveniences that the imaging lens system having a larger field angle will have such a structure as to comprise a small lens system in a large mount 3 and that the taking system for TV image will have an undesirable design containing a wide dead space. For this reason, it is desirable to limit within 4° the difference in half field angle of the individual imaging lens systems or the individual cameras.

Figure 16:
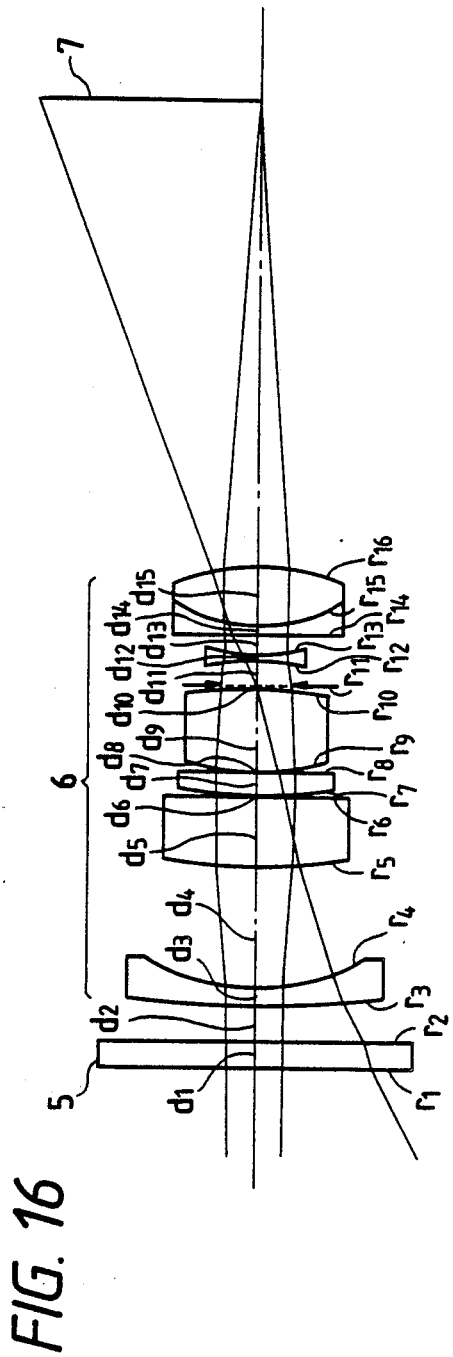
Figure 17:
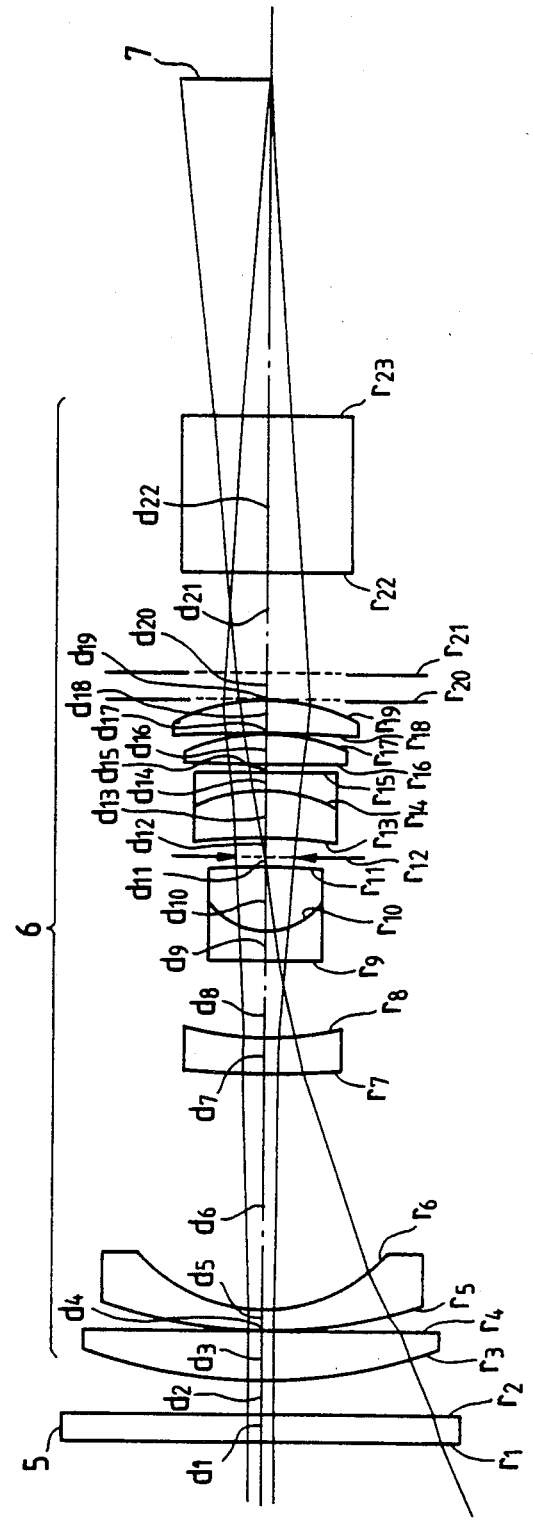

Now, the preferred embodiments of the imaging lens systems to be used in the taking system for TV image according to the present invention will be described below. FIG. 12 through FIG. 15 illustrate the Embodiments 1 through 4 which are to be attached to a TV monitor having a diagonal length of 200 and so designed as to have substantially the same half field angle within a range of 20° to 25°. Further, FIG. 16 and FIG. 17 illustrate the Embodiments 5 and 6 respectively as design examples which are different from the Embodiments 1 through 4. The Embodiments 5 and 6 are so designed as to limit half field angles within a range of 23° to 27°. Listed below are numerical data of these embodiments wherein the reference symbols $r_1, r_2, \ldots$ represent radii of curvature on the surfaces of the respective lens components, the reference symbols $d_1, d_2, \ldots$ designate airspaces reserved between the neighboring lens surfaces, the reference symbols $n_1, n_2, \ldots$ denote refractive indices of the respective lens components, the reference symbols $\nu_1, \nu_2, \ldots$ represent Abbe's numbers of the respective lens components, the reference symbol $l_1$ designates distance as measured from the formost surface of the lens system to an object to be photographed, the reference symbol $l_2$ denotes distance as measured from the rearmost surface of the lens system to an image formed by the lens system, the reference symbol h represents height of image, the reference symbol f designates focal length of the lens system, and the reference symbol F denotes F number of the lens system.

| Embodiment 1 | | |
|---|---|---|
| $r_1 = \infty$ | | |
| $d_1 = 3.7091$ | $n_1 = 1.51633$ | $\nu_1 = 64.15$ |
| $r_2 = \infty$ | | |
| $d_2 = 2.9673$ | | |
| $r_3 = \infty$ | | |
| $d_3 = 4.1542$ | $n_2 = 1.51633$ | $\nu_2 = 64.15$ |
| $r_4 = \infty$ | | |
| $d_4 = 7.7150$ | | |
| $r_5 = 258.0288$ | | |
| $d_5 = 5.4747$ | $n_3 = 1.72000$ | $\nu_3 = 43.70$ |
| $r_6 = -779.3950$ | | |
| $d_6 = 0.2225$ | | |
| $r_7 = 78.8638$ | | |
| $d_7 = 3.6646$ | $n_4 = 1.62041$ | $\nu_4 = 60.27$ |
| $r_8 = 23.0753$ | | |
| $d_8 = 31.1716$ | | |
| $r_9 = 42.8258$ | | |
| $d_9 = 16.0235$ | $n_5 = 1.80440$ | $\nu_5 = 39.62$ |
| $r_{10} = -61.5599$ | | |
| $d_{10} = 0.7567$ | | |
| $r_{11} = \infty$ (stop) | | |
| $d_{11} = 3.9910$ | | |
| $r_{12} = -35.3511$ | | |
| $d_{12} = 2.9080$ | $n_6 = 1.78472$ | $\nu_6 = 25.71$ |
| $r_{13} = 51.7811$ | | |
| $d_{13} = 3.0415$ | | |
| $r_{14} = -39.2398$ | | |
| $d_{14} = 4.3620$ | $n_7 = 1.62041$ | $\nu_7 = 60.27$ |
| $r_{15} = -27.3883$ | | |
| $d_{15} = 0.8902$ | | |
| $r_{16} = 188.8429$ | | |
| $d_{16} = 5.1335$ | $n_8 = 1.61272$ | $\nu_8 = 58.75$ |
| $r_{17} = -5.9860$ | | |
| $d_{17} = 19.1392$ | | |
| $r_{18} = \infty$ | | |
| $d_{18} = 2.9673$ | $n_9 = 1.51633$ | $\nu_9 = 64.15$ |
| $r_{19} = \infty$ | | |
| $l_1 = -181.7$ | | |
| $l_2 = 69.8$ | | |
| $h = 28.7$ | | |
| $f = 57.2$ | | |
| F/5.8 | | |
| $\omega = 23.3°$ | | |

| Embodiment 2 | | |
|---|---|---|
| $r_1 = \infty$ | | |
| $d_1 = 4.2721$ | $n_1 = 1.51633$ | $\nu_1 = 64.15$ |
| $r_2 = \infty$ | | |
| $d_2 = 3.2856$ | | |
| $r_3 = 57.2253$ | | |
| $d_3 = 5.2230$ | $n_2 = 1.71300$ | $\nu_2 = 53.84$ |
| $r_4 = -446.6081$ | | |
| $d_4 = 5.1008$ | | |
| $r_5 = 130.8937$ | | |
| $d_5 = 2.9908$ | $n_3 = 1.69680$ | $\nu_3 = 55.52$ |
| $r_6 = 13.4813$ | | |
| $d_6 = 21.0146$ | | |
| $r_7 = 74.6434$ | | |
| $d_7 = 16.9643$ | $n_4 = 1.79952$ | $\nu_4 = 42.24$ |
| $r_8 = -34.0508$ | | |
| $d_8 = 1.2924$ | | |
| $r_9 = \infty$ | | |
| $d_9 = 6.2120$ | | |
| $r_{10} = -19.7696$ | | |
| $d_{10} = 2.0125$ | $n_5 = 1.78472$ | $\nu_5 = 25.71$ |
| $r_{11} = 42.5642$ | | |
| $d_{11} = 1.9256$ | | |
| $r_{12} = 336.0194$ | | |

-continued

Embodiment 2

| | | |
|---|---|---|
| $d_{12} = 2.9341$ | $n_6 = 1.62299$ | $\nu_6 = 58.14$ |
| $r_{13} = -25.2033$ | | |
| $d_{13} = 0.3546$ | | |
| $r_{14} = 109.0885$ | | |
| $d_{14} = 3.8116$ | $n_7 = 1.62230$ | $\nu_7 = 53.20$ |
| $r_{15} = -24.7665$ | | |

$l_1 = -199.9$
$l_2 = 46.5$
$h = 12.2$
$f = 27.9$
$F/5.6$
$\omega = 22.3°$

Embodiment 3

| | | |
|---|---|---|
| $1 = \infty$ | | |
| $d_1 = 3.7890$ | $n_1 = 1.51633$ | $\nu_1 = 64.15$ |
| $r_2 = \infty$ | | |
| $d_2 = 3.0312$ | | |
| $r_3 = \infty$ | | |
| $d_3 = 4.2436$ | $n_2 = 1.51633$ | $\nu_2 = 64.15$ |
| $r_4 = \infty$ | | |
| $d_4 = 7.8811$ | | |
| $r_5 = 169.9444$ | | |
| $d_5 = 9.6695$ | $n_3 = 1.69895$ | $\nu_3 = 30.12$ |
| $r_6 = -219.1631$ | | |
| $d_6 = 7.0930$ | | |
| $r_7 = 54.5733$ | | |
| $d_7 = 2.9402$ | $n_4 = 1.72916$ | $\nu_4 = 54.68$ |
| $r_8 = 16.3259$ | | |
| $d_8 = 30.1450$ | | |
| $r_9 = -117.8385$ | | |
| $d_9 = 21.2182$ | $n_5 = 1.69895$ | $\nu_5 = 30.12$ |
| $r_{10} = -36.5272$ | | |
| $d_{10} = 2.5765$ | | |
| $r_{11} = \infty$ (stop) | | |
| $d_{11} = 7.2445$ | | |
| $r_{12} = 20.0042$ | | |
| $d_{12} = 2.6068$ | $n_6 = 1.69895$ | $\nu_6 = 30.12$ |
| $r_{13} = 54.6976$ | | |
| $d_{13} = 1.7581$ | | |
| $r_{14} = 293.6906$ | | |
| $d_{14} = 2.8796$ | $n_7 = 1.62041$ | $\nu_7 = 60.27$ |
| $r_{15} = -25.4755$ | | |
| $d_{15} = 0.5456$ | | |
| $r_{16} = 68.3197$ | | |
| $d_{16} = 4.6529$ | $n_8 = 1.51633$ | $\nu_8 = 64.15$ |
| $r_{17} = -27.2397$ | | |
| $d_{17} = 7.5779$ | | |
| $r_{18} = \infty$ | | |
| $d_{18} = 21.2182$ | $n_9 = 1.51633$ | $\nu_9 = 64.15$ |
| $r_{19} = \infty$ | | |

$l_1 = -185.7$
$l_2 = 45.4$
$h = 12.1$
$f = 28.9$
$F/6.1$
$\omega = 21.8°$

Embodiment 4

| | | |
|---|---|---|
| $r_1 = \infty$ | | |
| $d_1 = 3.8011$ | $n_1 = 1.51633$ | $\nu_1 = 64.15$ |
| $r_2 = \infty$ | | |
| $d_2 = 3.0409$ | | |
| $r_3 = \infty$ | | |
| $d_3 = 4.2572$ | $n_2 = 1.51633$ | $\nu_2 = 64.15$ |
| $r_4 = \infty$ | | |
| $d_4 = 6.3858$ | | |
| $r_5 = 49.9445$ | | |
| $d_5 = 6.0817$ | $n_3 = 1.72916$ | $\nu_3 = 54.68$ |
| $r_6 = -927.8329$ | | |
| $d_6 = 12.6956$ | | |
| $r_7 = -54.7475$ | | |
| $d_7 = 2.1286$ | $n_4 = 1.67270$ | $\nu_4 = 32.10$ |
| $r_8 = 54.7475$ | | |
| $d_8 = 1.5204$ | | |
| $r_9 = \infty$ (stop) | | |

-continued

Embodiment 4

| | | |
|---|---|---|
| $d_9 = 11.1751$ | | |
| $r_{10} = 927.8329$ | | |
| $d_{10} = 6.0817$ | $n_5 = 1.72916$ | $\nu_5 = 54.68$ |
| $r_{11} = -49.9445$ | | |
| $d_{11} = 3.0409$ | | |
| $r_{12} = \infty$ | | |

$l_1 = -186.3$
$l_2 = 189.4$
$h = 96.4$
$f = 109.6$
$F/13.5$
$\omega = 23.3°$

Embodiment 5

| | | |
|---|---|---|
| $r_1 = \infty$ | | |
| $d_1 = 1.5702$ | $n_1 = 1.51633$ | $\nu_1 = 64.15$ |
| $r_2 = \infty$ | | |
| $d_2 = 1.8842$ | | |
| $r_3 = 46.2712$ | | |
| $d_3 = 1.0112$ | $n_2 = 1.56883$ | $\nu_2 = 56.34$ |
| $r_4 = 9.7664$ | | |
| $d_4 = 6.9715$ | | |
| $r_5 = 28.7363$ | | |
| $d_5 = 3.9191$ | $n_3 = 1.69680$ | $\nu_3 = 55.52$ |
| $r_6 = 84.2432$ | | |
| $d_6 = 0.0628$ | | |
| $r_7 = 19.4234$ | | |
| $d_7 = 1.3692$ | $n_4 = 1.61293$ | $\nu_4 = 37.00$ |
| $r_8 = 48.0304$ | | |
| $d_8 = 0.08160$ | | |
| $r_9 = 14.9202$ | | |
| $d_9 = 4.5346$ | $n_5 = 1.62041$ | $\nu_5 = 60.27$ |
| $r_{10} = -28.4261$ | | |
| $d_{10} = 0.2889$ | | |
| $r_{11} = \infty$ (stop) | | |
| $d_{11} = 1.3189$ | | |
| $r_{12} = -18.4085$ | | |
| $d_{12} = 0.5339$ | $n_6 = 1.66446$ | $\nu_6 = 35.71$ |
| $r_{13} = 9.7287$ | | |
| $d_{13} = 1.0049$ | | |
| $r_{14} = 99.3142$ | | |
| $d_{14} = 0.5339$ | $n_7 = 1.58267$ | $\nu_7 = 46.33$ |
| $r_{15} = 7.7252$ | | |
| $d_{15} = 3.2031$ | $n_8 = 1.65160$ | $\nu_8 = 58.67$ |
| $r_{16} = -12.5801$ | | |

$l_1 = -182.6$
$l_2 = 26.6$
$h = 12.1$
$f = 22.1$
$F/7.4$
$\omega = 27.1°$

Embodiment 6

| | | |
|---|---|---|
| $r_1 = \infty$ | | |
| $d_1 = 1.5700$ | $n_1 = 1.51633$ | $\nu_1 = 64.15$ |
| $r_2 = \infty$ | | |
| $d_2 = 1.8842$ | | |
| $r_3 = 30.1020$ | | |
| $d_3 = 2.6763$ | $n_2 = 1.64769$ | $\nu_2 = 33.80$ |
| $r_4 = \infty$ | | |
| $d_4 = 0.0669$ | | |
| $r_5 = 28.7451$ | | |
| $d_5 = 1.2043$ | $n_3 = 1.69680$ | $\nu_3 = 55.52$ |
| $r_6 = 9.5362$ | | |
| $d_6 = 13.8229$ | | |
| $r_7 = 58.2349$ | | |
| $d_7 = 2.0072$ | $n_4 = 1.75500$ | $\nu_4 = 52.33$ |
| $r_8 = 16.2469$ | | |
| $d_8 = 4.4493$ | | |
| $r_9 = \infty$ | | |
| $d_9 = 1.5991$ | $n_5 = 1.72916$ | $\nu_5 = 54.68$ |
| $r_{10} = 3.5648$ | | |
| $d_{10} = 4.0278$ | $n_6 = 1.60342$ | $\nu_6 = 38.01$ |
| $r_{11} = -28.4373$ | | |
| $d_{11} = 0.3212$ | | |

-continued

| Embodiment 6 | | |
|---|---|---|
| $r_{12} = \infty$ (stop) | | |
| $d_{12} = 1.5188$ | | |
| $r_{13} = 19.2684$ | | |
| $d_{13} = 2.6763$ | $n_7 = 1.74950$ | $\nu_7 = 35.27$ |
| $r_{14} = 7.8950$ | | |
| $d_{14} = 1.0437$ | $n_8 = 1.80518$ | $\nu_8 = 25.43$ |
| $r_{15} = 65.5036$ | | |
| $d_{15} = 0.6222$ | | |
| $r_{16} = \infty$ | | |
| $d_{16} = 1.6392$ | $n_9 = 1.62041$ | $\nu_9 = 60.27$ |
| $r_{17} = -11.2156$ | | |
| $d_{17} = 0.0669$ | | |
| $r_{18} = -67.6787$ | | |
| $d_{18} = 1.9336$ | $n_{10} = 1.62041$ | $\nu_{10} = 60.27$ |
| $r_{19} = -10.6054$ | | |
| $d_{19} = 0.1338$ | | |
| $r_{20} = \infty$ | | |
| $d_{20} = 1.4719$ | | |
| $r_{21} = \infty$ | | |
| $d_{21} = 5.9079$ | | |
| $r_{22} = \infty$ | | |
| $d_{22} = 9.3669$ | $n_{11} = 1.51663$ | $\nu_{11} = 64.15$ |
| $r_{23} = \infty$ | | |

$l_1 = -206.8$,
$l_2 = 20.0$,
$h = 5.1$,
$f = 11.6$,
F/7.0,
$\omega = 23.4°$

As is clear from the mumerical data of $l_1$ and $\omega$, each of the Embodiments satisfies the above-mentioned condition (15) and is so designed as to be set at approximately the same distance from an object to be photographed regardless of the focal lengths thereof. The Embodiments 1 through 4, 5 and 6 are so designed as to have a difference within 4° in the half field angles of the imaging lens systems.

Figure 18A:
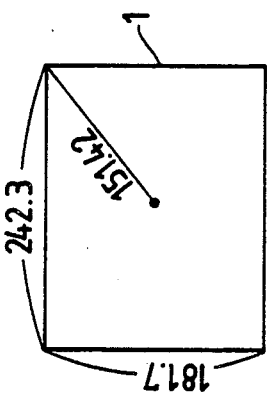
FIG. 18 is a conceptional diagram illustrating shape of the TV monitor screen to be combined with Embodiment 1 of the taking system for TV image according to the present invention.
Figure 18B:
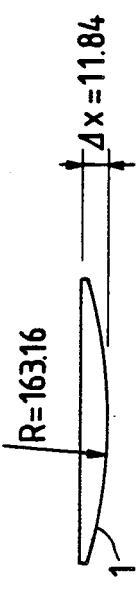
Figure 19:
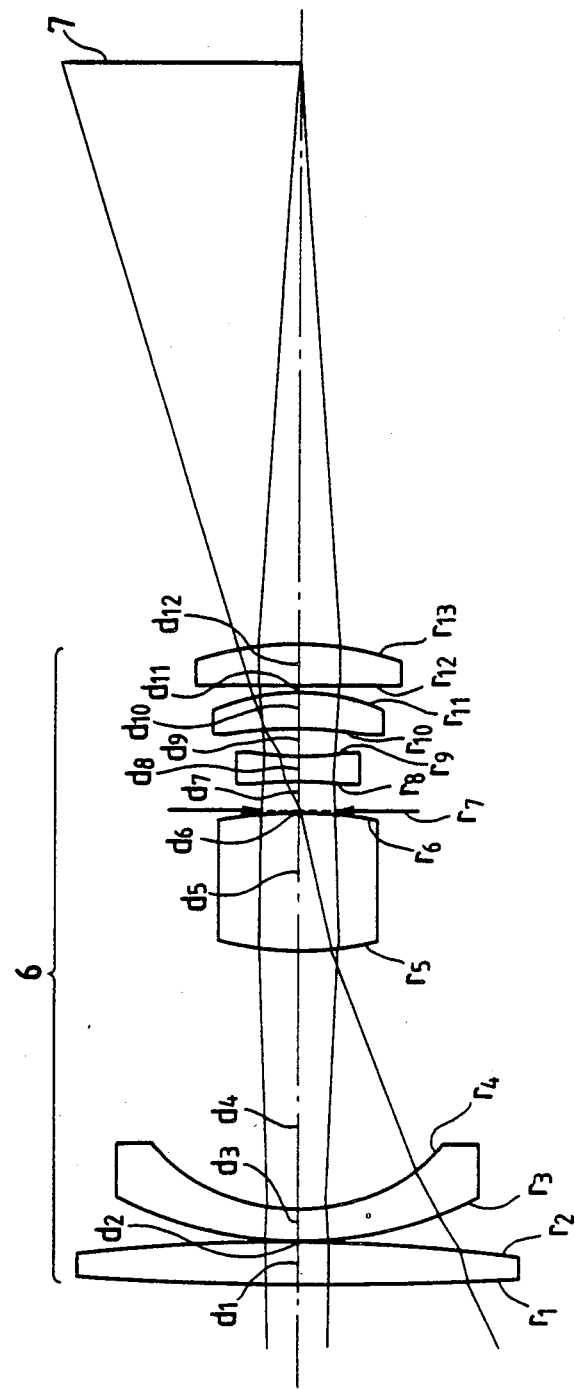
FIG. 19 is a sectional view illustrating Embodiment 7 of the imaging lens system according to the present invention to be used with the TV monitor shown in FIG. 18.

Now, description will be made on an embodiment of the lens system suited for photographing an image formed on the TV monitor having the cylindrical type screen, i.e., a lens system so composed as to satisfy the above-mentioned condition (8) with reference to FIG. 18 and FIG. 19. This Embodiment is designed on an assumption of $\Delta x = 11.84$ and has the following numerical data wherein the reference symbol $l_3$ represents distance as measured from the foremost surface to the front focal point of the lens system, the reference symbol IH designates the maximum height of image and the reference symbol DT denotes distortion at an object height of 151.418 and an image height of 19.34. Further, the Embodiment 7 is designed for a half field angle of 25.010.

| Embodiment 7 | | |
|---|---|---|
| $r_1 = 325.8590$ | | |
| $d_1 = 3.3316$ | $n_1 = 1.72000$ | $\nu_1 = 43.70$ |
| $r_2 = -153.8113$ | | |
| $d_2 = 0.1500$ | | |
| $r_3 = 31.4745$ | | |
| $d_3 = 2.4700$ | $n_2 = 1.62041$ | $\nu_2 = 60.27$ |
| $r_4 = 15.2028$ | | |
| $d_4 = 20.9973$ | | |
| $r_5 = 35.6602$ | | |
| $d_5 = 10.7681$ | $n_3 = 1.80440$ | $\nu_3 = 39.62$ |
| $r_6 = -65.5498$ | | |
| $d_6 = 0.3279$ | | |
| $r_7 = \infty$ (stop) | | |
| $d_7 = 2.4901$ | | |
| $r_8 = -24.0271$ | | |
| $d_8 = 1.9600$ | $n_4 = 1.78472$ | $\nu_4 = 25.71$ |
| $r_9 = 43.5331$ | | |
| $d_9 = 2.0500$ | | |

-continued

| Embodiment 7 | | |
|---|---|---|
| $r_{10} = -32.0967$ | | |
| $d_{10} = 2.9400$ | $n_5 = 1.62041$ | $\nu_5 = 60.27$ |
| $r_{11} = -17.7915$ | | |
| $d_{11} = 0.6000$ | | |
| $r_{12} = 281.1523$ | | |
| $d_{12} = 3.4600$ | $n_6 = 1.61272$ | $\nu_6 = 58.75$ |
| $r_{13} = -25.2132$ | | |

$l_1 = 295.000$,
$l_3 = 3.768$,
I H = 19.340,
$f = 36.759$,
DT = 3.813

At the maximum image height, this lens system has distortion:

$$DISL = +3.813 \qquad (17)$$

Figure 1:
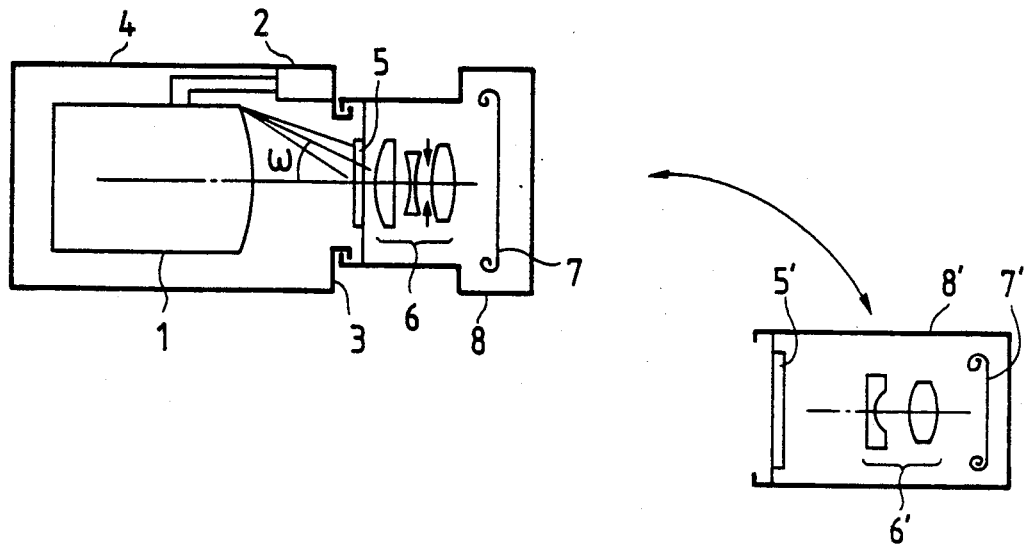
FIG. 1 is shows sectional views illustrating the conventional example of the taking systems for TV images.
Figure 2A:
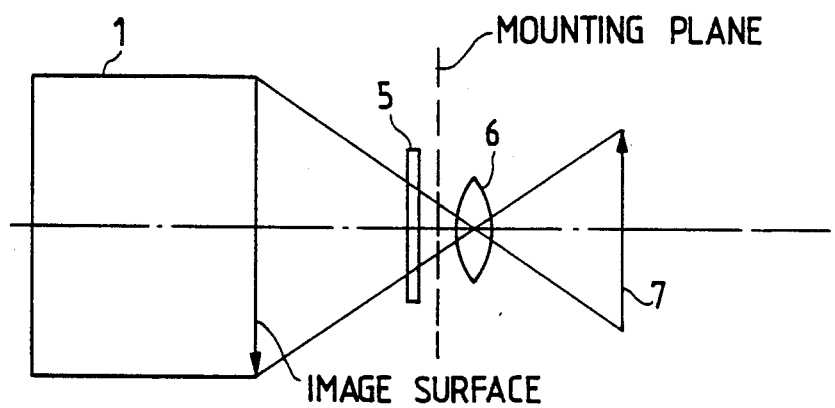
FIG. 2A and FIG. 2B are sectional views illustrating functional principle of the conventional example.
Figure 2B:
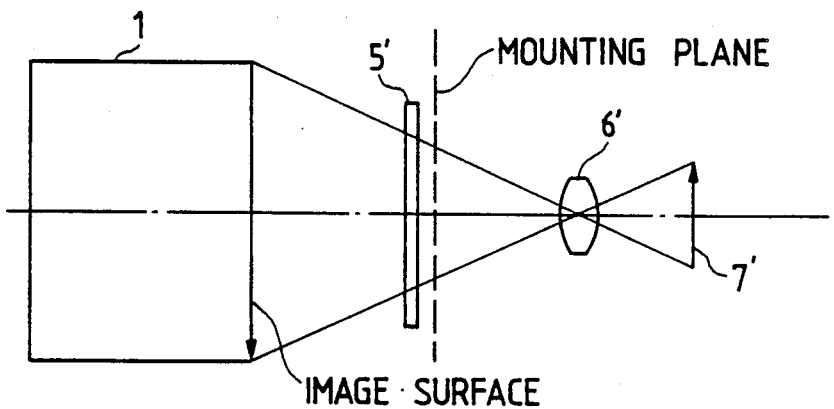
Figure 3A:
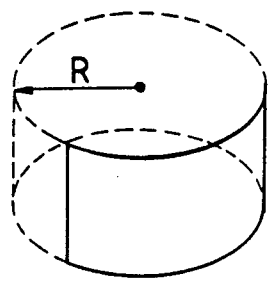
FIGS. 3A and 3B are sketches illustrating the two types of TV monitor screens.
Figure 3B:
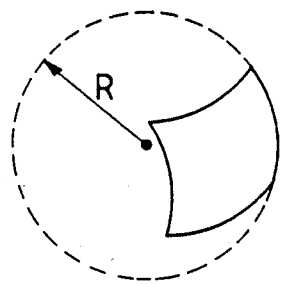
Figure 4A:
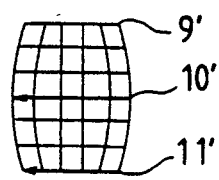
FIG. 4A, FIG. 4B and FIG. 4C are diagrams illustrating the principle of distortion to be produced by photographing an image formed on the cylindrical type screen of the TV monitor.
Figure 4C:
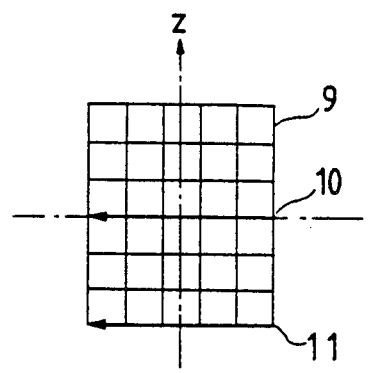
Figure 4B:
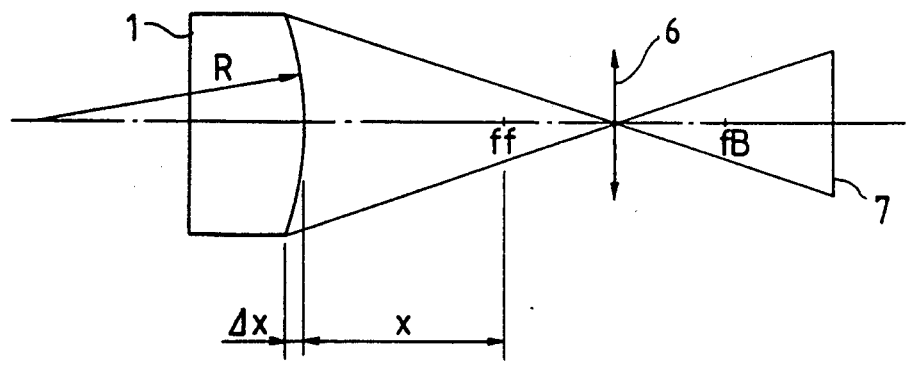
Figure 5A:
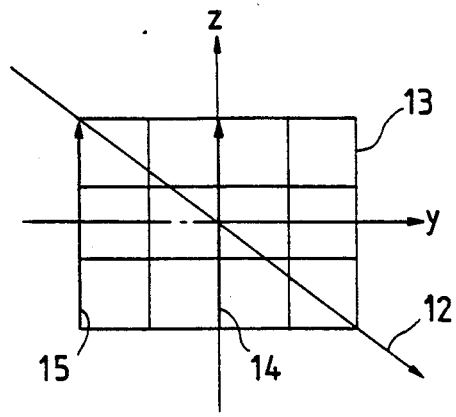
FIG. 5A, FIG. 5B and FIG. 5C are diagrams illustrating shape of the spherical type screen of the TV monitor screen.
Figure 5B:
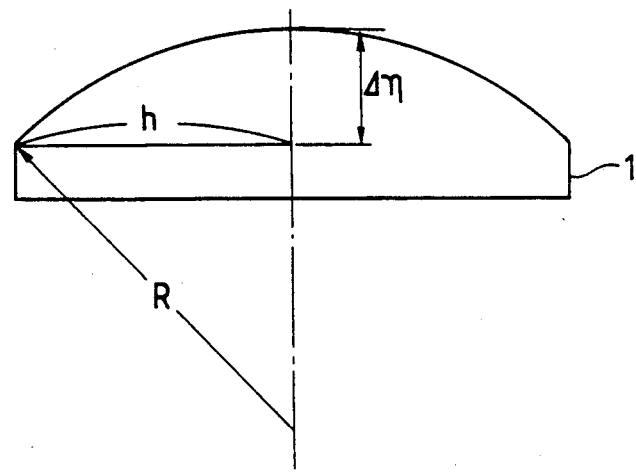
Figure 5C:
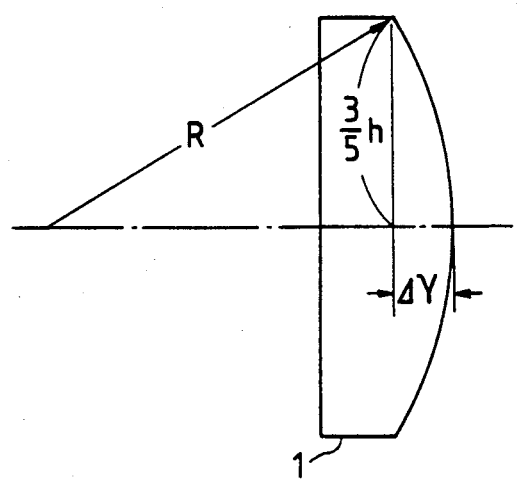
Figure 6:
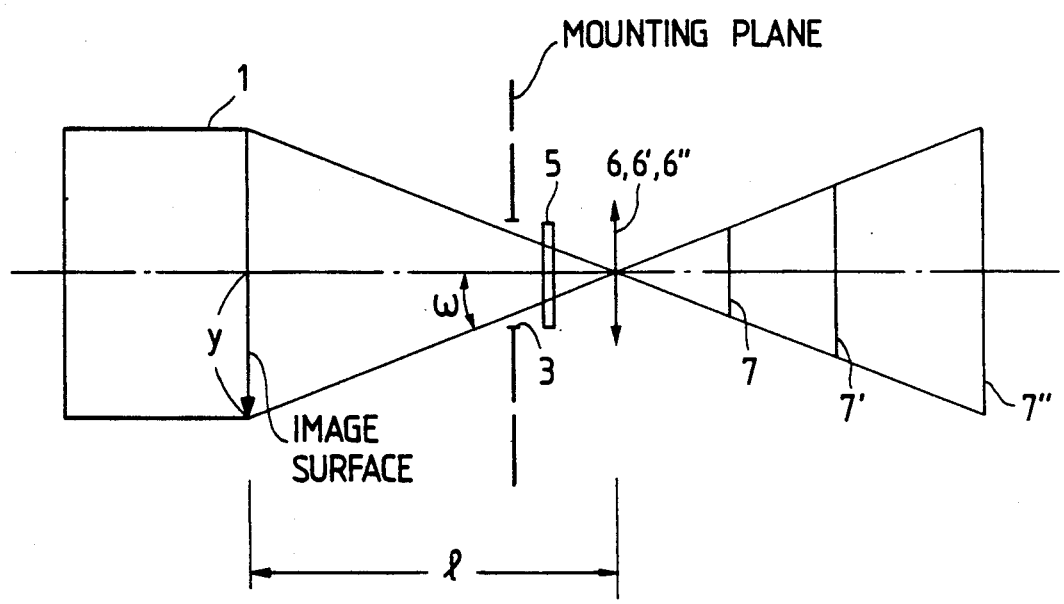
FIG. 6 is a conceptional diagram of the taking system for TV image according to the present invention.
Figure 8:
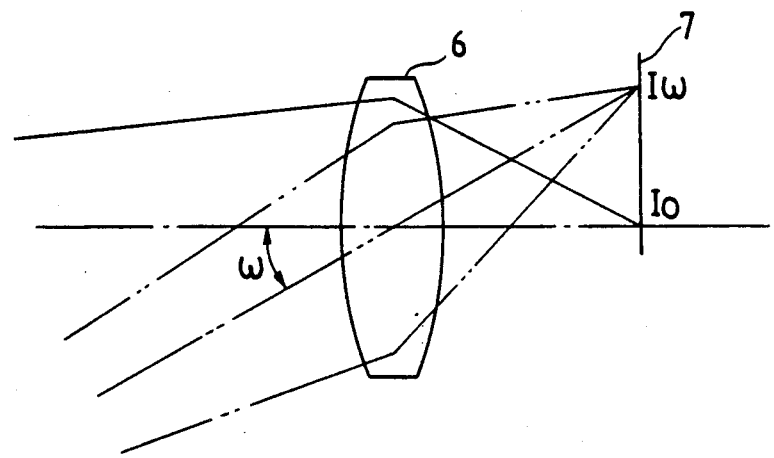
FIG. 8 is a diagram illustrating relationship between the half field angle and marginal irradiated height.

Further, the distortion DISC produced by a combination of the TV monitor shown in FIG. 1 and a distortion-free optical system having the same paraxial relationship as that of the Embodiment 7 is calculated by using $x = 298.768$ and $\Delta x = 11.84$ in the formula (4) as follows:

$$DISC = -3.81(\%) \qquad (18)$$

Hence, from the formulae (17) and (18), we obtain:

$$DISL + DISC \approx 0 \qquad (19)$$

Figure 21:
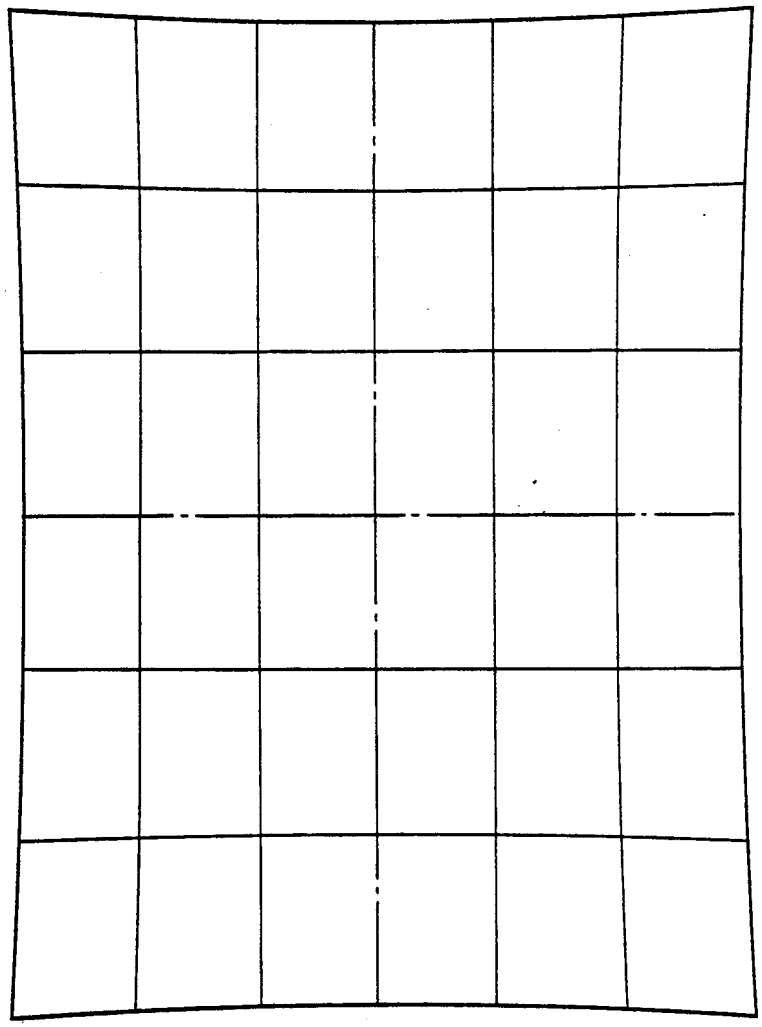
FIG. 20 and FIG. 21 are diagrams illustrating distortion and a lattice image on the imaging surface respectively in the Embodiment 7.
Figure 20:
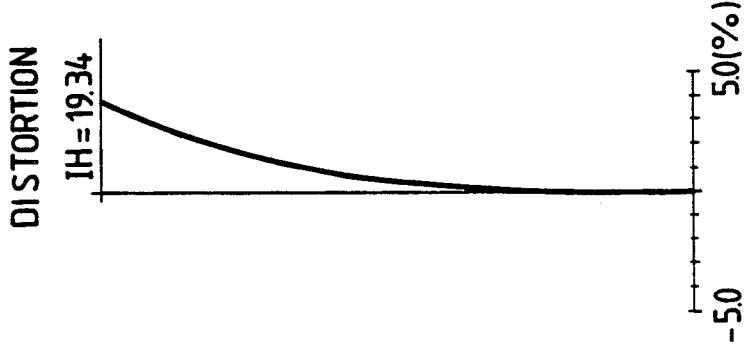

That is to say, the Embodiment 8 satisfies the condition (8), or forms an image which is not distorted on the imaging surface. FIG. 20 and FIG. 21 illustrate distortion produced by the lens system described as the Embodiment 7 and an image of a lattice pattern on the imaging surface which is obtained by photographing a lattice pattern traced on a plane perpendicular to the optical axis.

Now description will be made, with reference to FIG. 22A, FIG. 22B, FIG. 22C and FIG. 23, on an embodiment of the lens system suited for photographing an image formed on the TV monitor having the spherical type screen, i.e., a lens system so composed as to satisfy the formula (2). This Embodiment is designed on assumptions of $\Delta 7 = 4.24$, $\Delta \gamma = 1.52$, and has the following numerical data wherein the reference symbol $l_4$ represents distance as measured from the formost surface to the front focal point of the lens system and the reference symbol DT designates distortion at an object height of 66.06 and an image height of 19.34. In addition, the Embodiment 8 has a half field angle of 22.655°.

| Embodiment 8 | | |
|---|---|---|
| $r_1 = \infty$ | | |
| $d_1 = 2.5000$ | $n_1 = 1.51633$ | $\nu_1 = 64.15$ |
| $r_2 = \infty$ | | |
| $d_2 = 2.0000$ | | |
| $r_3 = \infty$ | | |
| $d_3 = 2.8000$ | $n_2 = 1.51633$ | $\nu_2 = 64.15$ |
| $r_4 = \infty$ | | |
| $d_4 = 5.2000$ | | |
| $r_5 = 471.2135$ | | |
| $d_5 = 3.6900$ | $n_3 = 1.72000$ | $\nu_3 = 43.70$ |
| $r_6 = -139.1864$ | | |
| $d_6 = 0.1500$ | | |
| $r_7 = 43.7508$ | | |
| $d_7 = 2.470$ | $n_4 = 1.62041$ | $\nu_4 = 60.27$ |
| $r_8 = 15.3470$ | | |

-continued

Embodiment 8

| | | |
|---|---|---|
| $d_8 = 21.0100$ | | |
| $r_9 = 32.2817$ | | |
| $d_9 = 10.8000$ | $n_5 = 1.80440$ | $\nu_5 = 39.62$ |
| $r_{10} = -45.5042$ | | |
| $d_{10} = 0.5100$ | | |
| $r_{11} = \infty$ (stop) | | |
| $d_{11} = 2.6900$ | | |
| $r_{12} = -24.6471$ | | |
| $d_{12} = 1.9600$ | $n_6 = 1.78472$ | $\nu_6 = 25.71$ |
| $r_{13} = 37.5067$ | | |
| $d_{13} = 2.0500$ | | |
| $r_{14} = -24.1233$ | | |
| $d_{14} = 2.9400$ | $n_7 = 1.62041$ | $\nu_7 = 60.27$ |
| $r_{15} = -17.8994$ | | |
| $d_{15} = 0.6000$ | | |
| $r_{16} = 182.0581$ | | |
| $d_{16} = 3.4600$ | $n_8 = 1.61272$ | $\nu_8 = 58.75$ |
| $r_{17} = -26.4501$ | | |
| $d_{17} = 12.9000$ | | |
| $r_{18} = \infty$ | | |
| $d_{18} = 2.0000$ | $n_9 = 1.51633$ | $\nu_9 = 64.15$ |
| $r_{19} = \infty$ | | |

$l_1 = -122.500,$
$l_4 = 11.619,$
$IH = 19.340,$
$f = 38.915,$
$DT = 1.000$

When this lens system is used independently, it produces distortion as follows:

$$DISL = +1.000(\%) \quad (20)$$

Figure 22A:
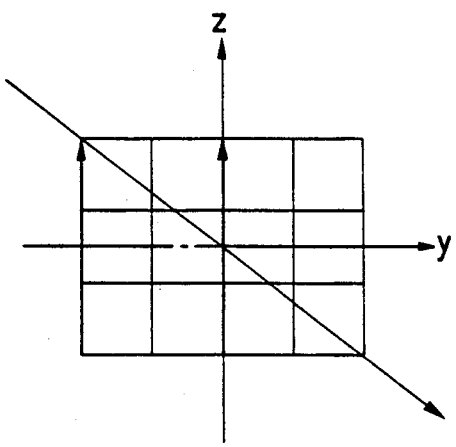
FIG. 22A, FIG. 22B and FIG. 22C are schematic diagrams illustrating shape of the TV monitor screen to be combined with the Embodiment 2 of the taking system for TV image according to the present invention.
Figure 22B:
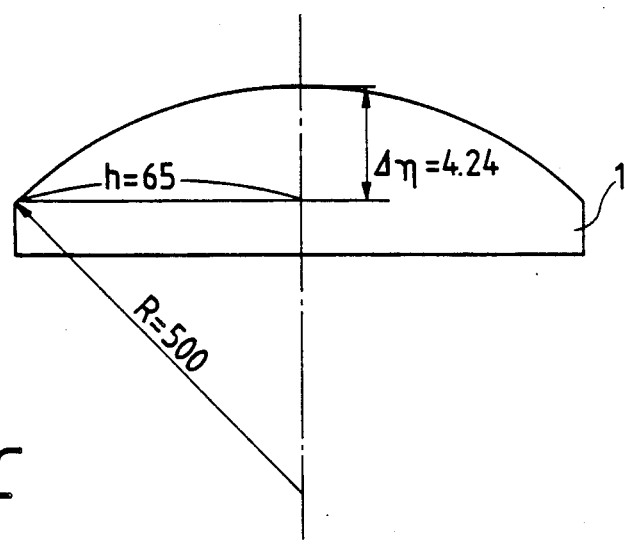
Figure 22C:
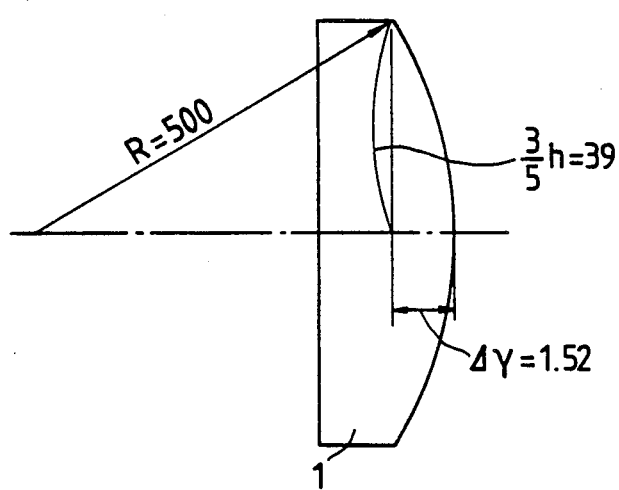
Figure 23:
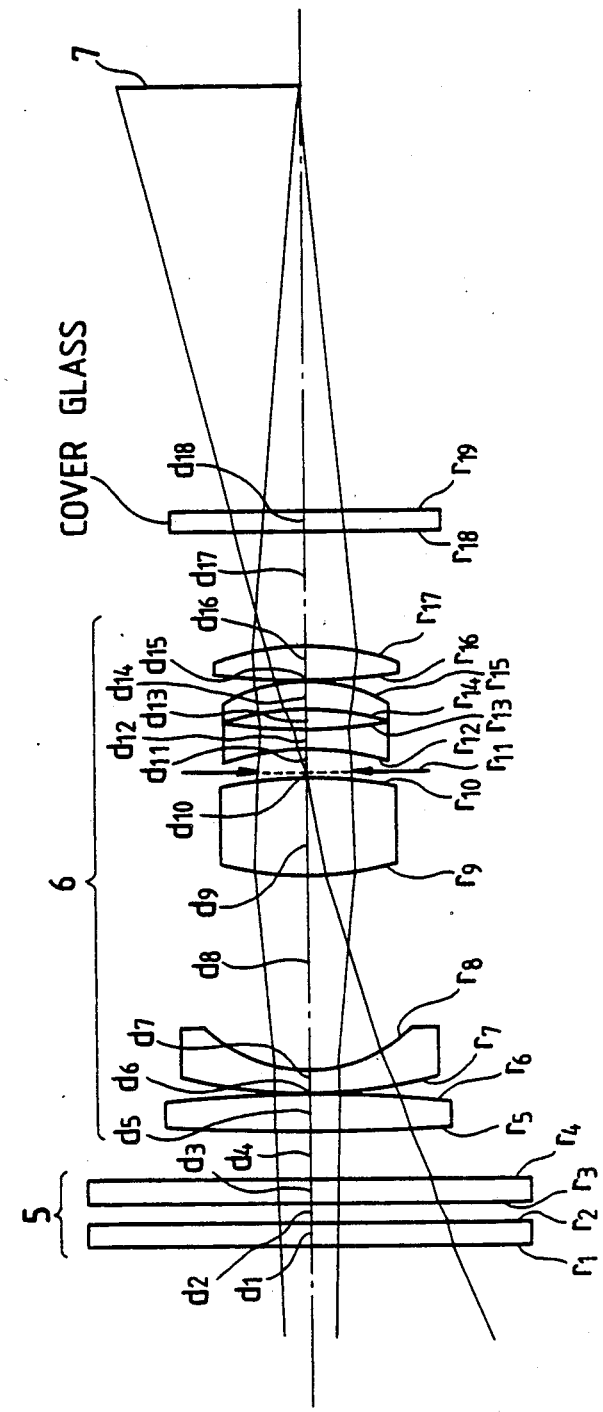
FIG. 23 is a sectional diagram illustrating Embodiment 8 of the imaging lens system according to the present invention to be used with the TV monitor shown in FIG. 22A, FIG. 22B and FIG. 22C.

Further, when the TV monitor shown in FIG. 22A, FIG. 22B and FIG. 22C is combined with a distortion-free optical system having the same paraxial relationship as that of the lens system, the distortion DISS produced by this combination is calculated by using $x=134.1$, $\Delta\eta=4.24$ and $\Delta\gamma=1.52$ in the formula (7) as follows:

$$DISS = -2.00(\%) \quad (21)$$

Hence, from the formulae (20) and (21), we obtain:

$$DISL + DISS = -1 \quad (22)$$

That is to say, the Embodiment 8 satisfies the formula (9), i.e., forms an image which is not distorted on the imaging surface.

Figure 25:
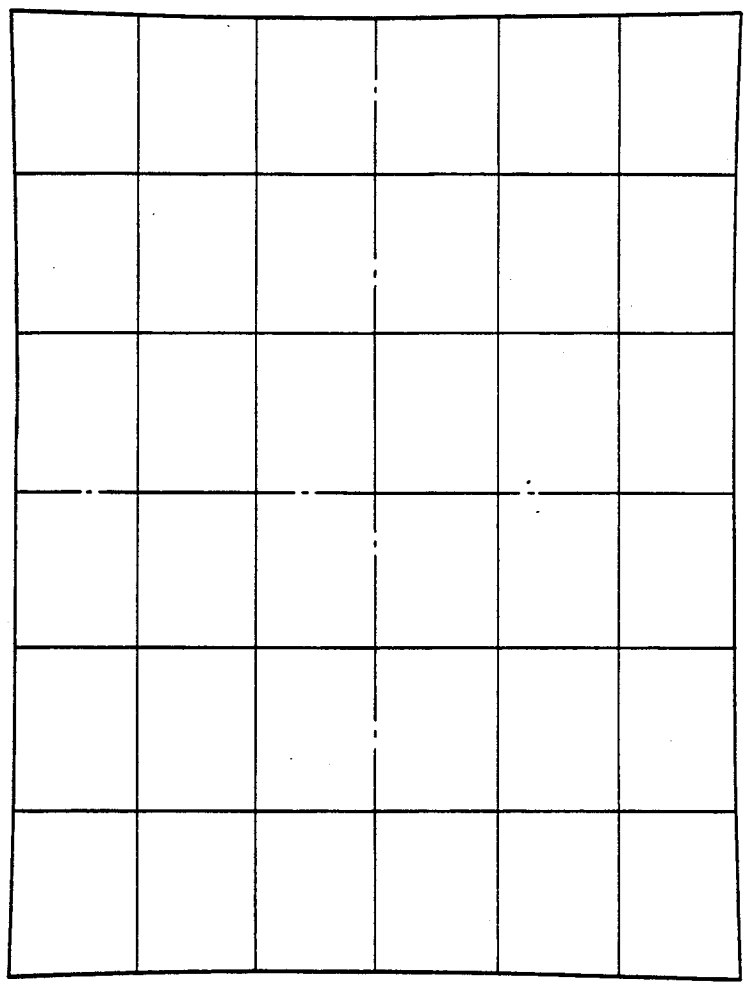
FIG. 24 and FIG. 25 are diagrams illustrating distortion and a lattice image on the imaging surface respectively in the Embodiment of the imaging lens system.
Figure 24:
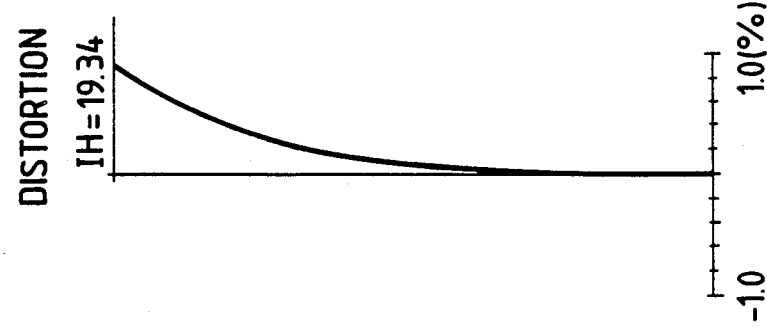

FIG. 24 and FIG. 25 illustrate distortion produced by the lens system described as the Embodiment 8 and an image of a lattice pattern on the imaging surface which is obtained by photographing a lattice pattern traced on a plane perpendicular to the optical axis.

Further, since the Embodiments 7 and 8 described above are so designed as to correct distortion of image not by the CRT proper but by the lens systems, these Embodiments facilitate correction of distortion and are free from the inconvenience to allow images to be distorted when the TV monitor is observed by human eyes. As for compositions of the lens systems described as the Embodiments 7 and 8, each of the lens system can generally be composed of six components of six elements as exemplified by Japanese Preliminary Patent Publication No. 34731/60. Each of the Embodiments 7 and 8 is designed so that, with the intention that distortion has a positive value, namely, distortion of the pincushion type is produced, the curvature is higher on the front surface of the first lens component than on the rear surface thereof and the off-axial principal ray is inwardly deflected by the first lens component arranged in the front lens group.

As is understood from the foregoing description, the Embodiments 7 and 8 have practically important advantages that the imaging lens systems permit, when photographing images formed on screens having curvature, photographing the images in the normal shapes thereof by easily correcting distortion of the images caused by magnification difference due to the curvature, and that the lens systems are free from the inconvenience, unlike the case where the distortion is corrected by the CRT proper, of images distorted when the TV monitor is observed by human eyes.

What is claimed is:

1. A taking system for TV image so adapted as to photograph images formed on a TV screen on the basis of video signals, comprising:

a plural number of cameras, having film sizes different from one another, for selective attachment in front of the TV screen, said cameras including imaging lens systems having different focal lengths, said half field angles of the imaging lens systems of the cameras being set within a range from 20° to 30°.

2. A taking system for TV image according to claim 1 wherein said imaging lens systems of the cameras have half field angles different from one another within a range of 4°.

3. A taking system for TV image so adapted as to photograph images formed on a curved TV screen on the basis of video signals, comprising:

a plurality of cameras for disposition in front of said TV screen and having respective imaging lens systems, said imaging lens systems being designed to produce distortion of a pincushion type for correcting distortion of the images caused by curvature of said curved TV screen.

4. A taking system for TV image according to claim 1 wherein an absorption type of color filter is arranged on an incident side of the imaging lens system of each of said cameras.

5. A taking system for TV image according to claim 3 wherein each of said imaging lens systems has distortion satisfying conditions defined below:

$-2 \leq DISL + DISC \leq 1.5$ when the screen of the cylindrical type $-2 \leq DISL + DISS \leq 1.5$ when the screen is of the spherical type wherein the reference symbol DISL represents distortion produced by the imaging lens system, the reference symbol DISC designates distortion produced by the cylindrical type of screen and the reference symbol DISS denotes distortion produced by the spherical type of screen.

6. A taking system for TV image according to claim 5 wherein each of said imaging lens systems is provided with a lens, closest to an object, having a positive refracting power that curvature of a surface on an image side is higher than that of a surface on an object side.

* * * * *